(12) United States Patent
Goldgraber et al.

(10) Patent No.: US 10,264,120 B2
(45) Date of Patent: Apr. 16, 2019

(54) AUTOMATED DATA COLLECTION AND ANALYTICS

(71) Applicant: Accenture Global Solutions Limited, Dublin (IE)

(72) Inventors: Avigail Goldgraber, Washington, DC (US); Andrew H. Scott, Richmond (AU); Lora Leigh Nunnelley, Birmingham, AL (US); Eric Citron, Chicago, IL (US)

(73) Assignee: Accenture Global Solutions Limited, Dublin (IE)

( * ) Notice: Subject to any disclaimer, the term of this patent is extended or adjusted under 35 U.S.C. 154(b) by 146 days.

(21) Appl. No.: 15/394,940

(22) Filed: Dec. 30, 2016

(65) Prior Publication Data

US 2018/0191884 A1 Jul. 5, 2018

(51) Int. Cl.
*H04M 3/42* (2006.01)
*H04M 1/24* (2006.01)

(52) U.S. Cl.
CPC .......... *H04M 3/42221* (2013.01); *H04M 1/24* (2013.01); *H04M 2201/39* (2013.01); *H04M 2203/556* (2013.01); *H04M 2242/18* (2013.01)

(58) Field of Classification Search
CPC ............. H04M 3/5175; H04M 3/5183; H04M 3/5191; H04M 3/51; H04M 3/4878; H04M 3/5233; H04M 3/42221; H04M 3/523; H04M 2203/556; H04M 2201/40; H04M 2203/551; H04M 3/42068
USPC .............. 379/265.09, 202.01, 265.1, 265.12, 379/220.01, 265.06, 88.14, 112.09, 379/142.17, 189, 201.12, 221.14, 265.03, 379/265.13, 266.07, 85, 88.01, 93.21
See application file for complete search history.

(56) References Cited

U.S. PATENT DOCUMENTS

| 9,479,642 | B2 | 10/2016 | Slovacek | |
|---|---|---|---|---|
| 2002/0150221 | A1* | 10/2002 | Carson | H04M 3/2218 379/126 |
| 2007/0201664 | A1* | 8/2007 | Salafia | H04M 3/5116 379/201.01 |
| 2009/0231438 | A1* | 9/2009 | Srivastava | H04N 17/004 348/180 |
| 2009/0306933 | A1* | 12/2009 | Chan | G06Q 30/02 702/181 |
| 2010/0172246 | A1* | 7/2010 | Adam | H04L 12/66 370/242 |

(Continued)

*Primary Examiner* — Akelaw Teshale
(74) *Attorney, Agent, or Firm* — Harrity & Harrity, LLP

(57) ABSTRACT

A device may generate a call plan for a set of testing calls. The device may initiate a testing call to a communication device associated with a target, of the set of targets, using a user profile of the set of user profiles. The device may initiate monitoring for the testing call to identify information associated with the target during the testing call. The device may generate one or more responses to one or more queries based on the user profile. The device may transmit the one or more responses to the one or more queries based on generating the one or more responses to the one or more queries. The device may process stored data regarding testing calls to generate a recommendation relating to the set of targets for the set of testing calls. The device may communicate with one or more other devices to implement the recommendation.

20 Claims, 7 Drawing Sheets

(56) References Cited

U.S. PATENT DOCUMENTS

| | | | |
|---|---|---|---|
| 2014/0098948 A1* | 4/2014 | Kulkarni | H04L 51/046 379/265.03 |
| 2014/0335480 A1 | 11/2014 | Asenjo et al. | |
| 2016/0173690 A1* | 6/2016 | Perez | G06F 17/16 379/265.03 |

* cited by examiner

AUTOMATED DATA COLLECTION AND ANALYTICS

BACKGROUND

In some environments, a customer may contact an organization and/or interact with the organization to make arrangements, such as to schedule an appointment. For example, the customer may contact the organization by phone and may speak with a human representative or automated system. As other examples, the customer may contact and/or interact with the organization by textual methods, such as by email, by instant message (e.g., a chat program provided on a website), or the like.

SUMMARY

According to some possible implementations, a device may include one or more processors. The one or more processors may generate a call plan for a set of testing calls. The call plan may include information identifying a set of targets for the set of testing calls and a set of user profiles for the set of testing calls. The one or more processors may initiate a testing call, of the set of testing calls, to a communication device associated with a target, of the set of targets, using a user profile of the set of user profiles. The one or more processors may initiate monitoring for the testing call to identify information exchanged between the device and the communication device associated with the target during the testing call. The one or more processors may receive one or more queries during the testing call from the communication device based on the monitoring the testing call. The one or more processors may generate one or more responses to the one or more queries based on the user profile. The one or more processors may transmit, to the communication device, the one or more responses to the one or more queries based on generating the one or more responses to the one or more queries. The one or more processors may store data regarding the testing call. The data may relate to one or more metrics associated with the testing call or information received during the testing call. The one or more processors may process the stored data regarding the testing call and other data regarding one or more other testing calls to generate a recommendation relating to the set of targets for the set of testing calls. The one or more processors may communicate with one or more other devices to implement the recommendation.

According to some possible implementations, a method may include obtaining, by a device, data regarding a set of testing calls of a target of testing. The data may relate to scheduling of appointments with the target of testing. The method may include generating, by the device, a set of recommendations for the target of testing based on the data regarding the set of testing calls. The set of recommendations may relate to improving scheduling of appointments with the target of testing. The method may include generating, by the device, a user interface including information relating to the set of recommendations. The information may relate to the set of recommendations including the set of recommendations and a ranking of the target of testing within a group of entities. The method may include providing, by the device, the user interface for display. The method may include detecting, by the device, a user interaction with the user interface. The user interaction may be associated with selecting a particular recommendation of the set of recommendations. The method may include transmitting, by the device, information to cause the particular recommendation to be implemented and the user interface to be updated.

According to some possible implementations, a non-transitory computer-readable medium may store instructions that, when executed by one or more processors, cause the one or more processors to initiate a plurality of testing calls for an entity. The plurality of testing calls may be associated with testing scheduling of appointments at the entity. The one or more instructions, when executed by the one or more processors, may cause the one or more processors to obtain data regarding the plurality of testing calls. The data may be associated with customer experience for scheduling of appointments at the entity. The one or more instructions, when executed by the one or more processors, may cause the one or more processors to process the data to generate a set of metrics regarding the entity. The one or more instructions, when executed by the one or more processors, may cause the one or more processors to generate a recommendation for the entity based on the set of metrics. The recommendation may be associated with improving one or more metrics of the set of metrics. The one or more instructions, when executed by the one or more processors, may cause the one or more processors to generate a user interface to provide results of the plurality of testing calls. The user interface may include information identifying the set of metrics and information identifying the recommendation. The one or more instructions, when executed by the one or more processors, may cause the one or more processors to provide the user interface for display.

DETAILED DESCRIPTION

The following detailed description of example implementations refers to the accompanying drawings. The same reference numbers in different drawings may identify the same or similar elements.

A hospital or group of hospitals may permit a customer to make an appointment (e.g., by phone, by email, by text, by a website, etc.) For example, a customer may use a hospital website to identify a particular doctor, and may call the hospital to make an appointment with the particular doctor. Additionally, or alternatively, a customer may call a hospital operator with symptoms (e.g., of an illness, of a health condition, etc.) to get a recommendation for a doctor who may diagnose and/or treat illnesses or conditions that may be associated with those symptoms.

A hospital may desire to interact with such a customer as effectively as possible. However, the hospital may not have an effective way to evaluate a level of performance of the hospital in interacting with the customer, such as with respect to ease of scheduling, user experience, or the like.

Implementations, described herein, provide an analytics gathering, analysis, and recommendation platform (e.g., a cloud platform) for hospitals. The analytics gathering, analysis, and recommendation platform may provide artificial intelligence (AI) based automations, such as voice recognition and speech synthesis (e.g., to conduct calls with operators to obtain data), automated data gathering from calls, automated data analysis, automated recommendation generation, or the like. The analytics gathering, analysis, and recommendation platform may further provide recommendations to improve hospital operations related to user interaction, such as scheduling, patient information, or the like.

In this way, the analytics gathering, analysis, and recommendation platform reduces errors in data collection, which reduces a need to re-collect data (thereby reducing network traffic to communicate with hospital servers, reducing utilization of computing resources for operators to get information from hospital servers, etc.). Furthermore, the analytics gathering, analysis, and recommendation platform reduces costs associated with data collection and analytics relative to requiring manual data collection and analytics.

Although implementations, described herein, are described in terms of a healthcare context, implementations, described herein, may also be used in analysis of another context, such as a university scheduling context, a customer service context, or the like.

Figure 1A:
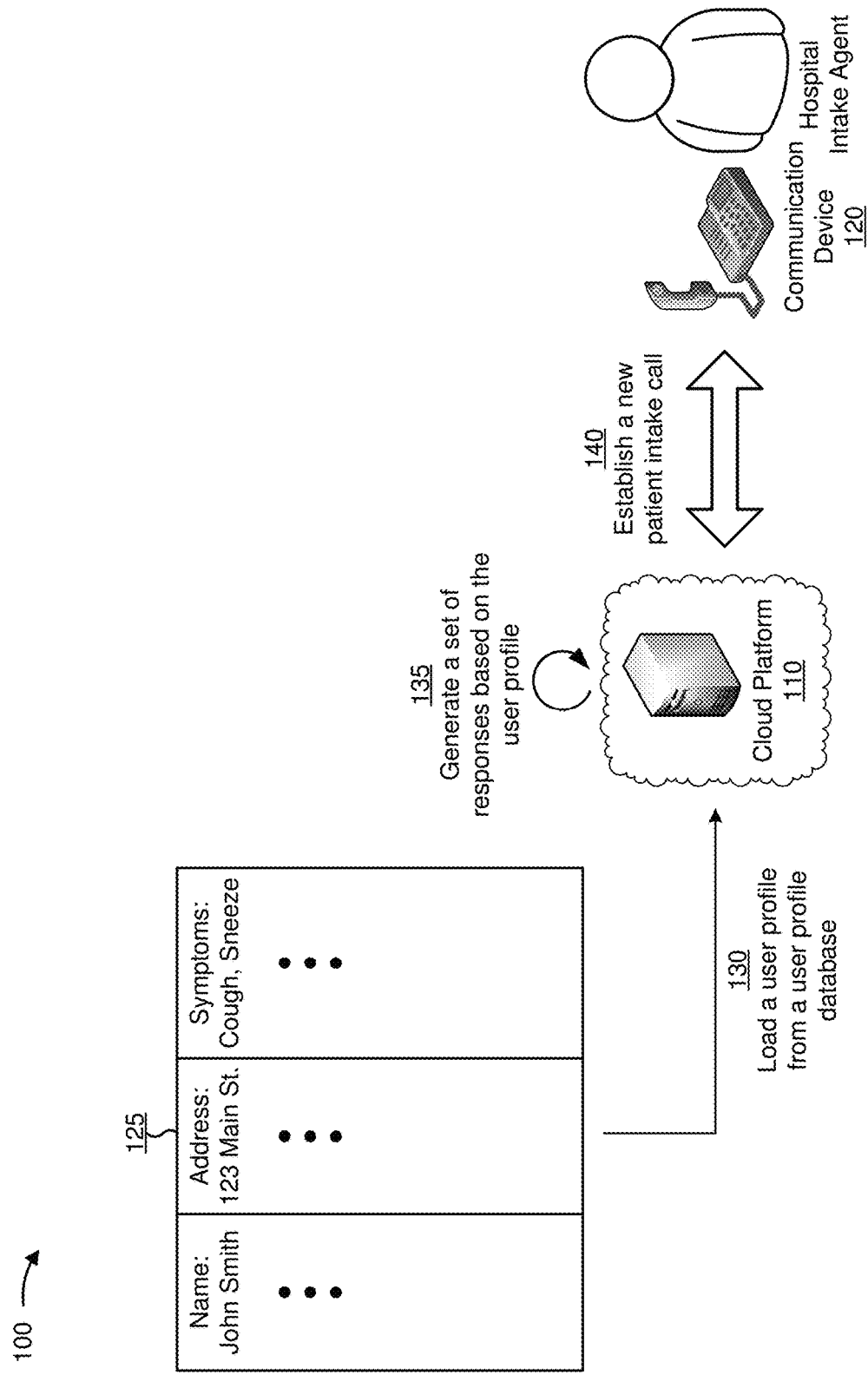
FIGS. 1A-1C are diagrams of an overview of an example implementation described herein.
Figure 1B:
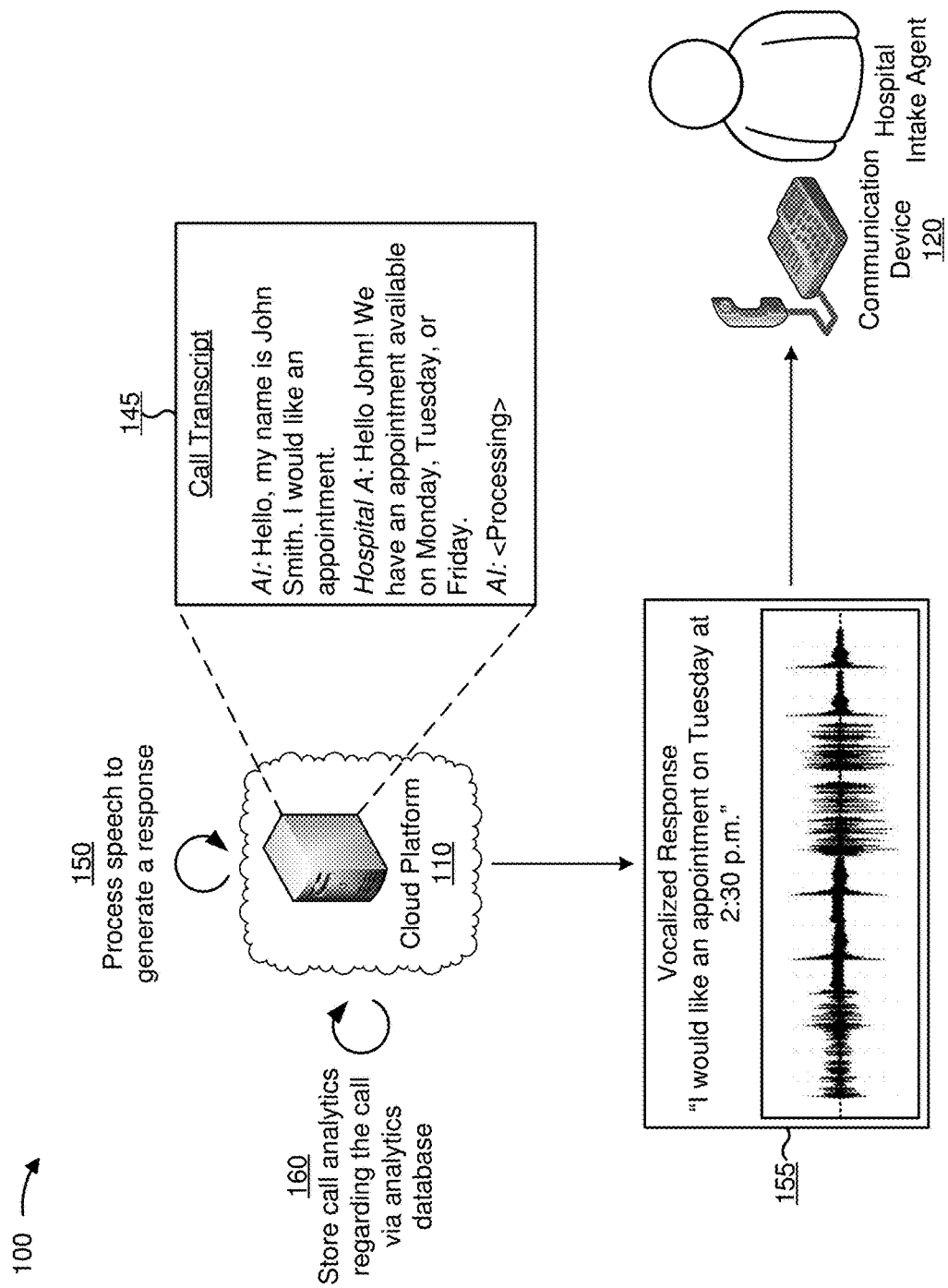
Figure 1C:
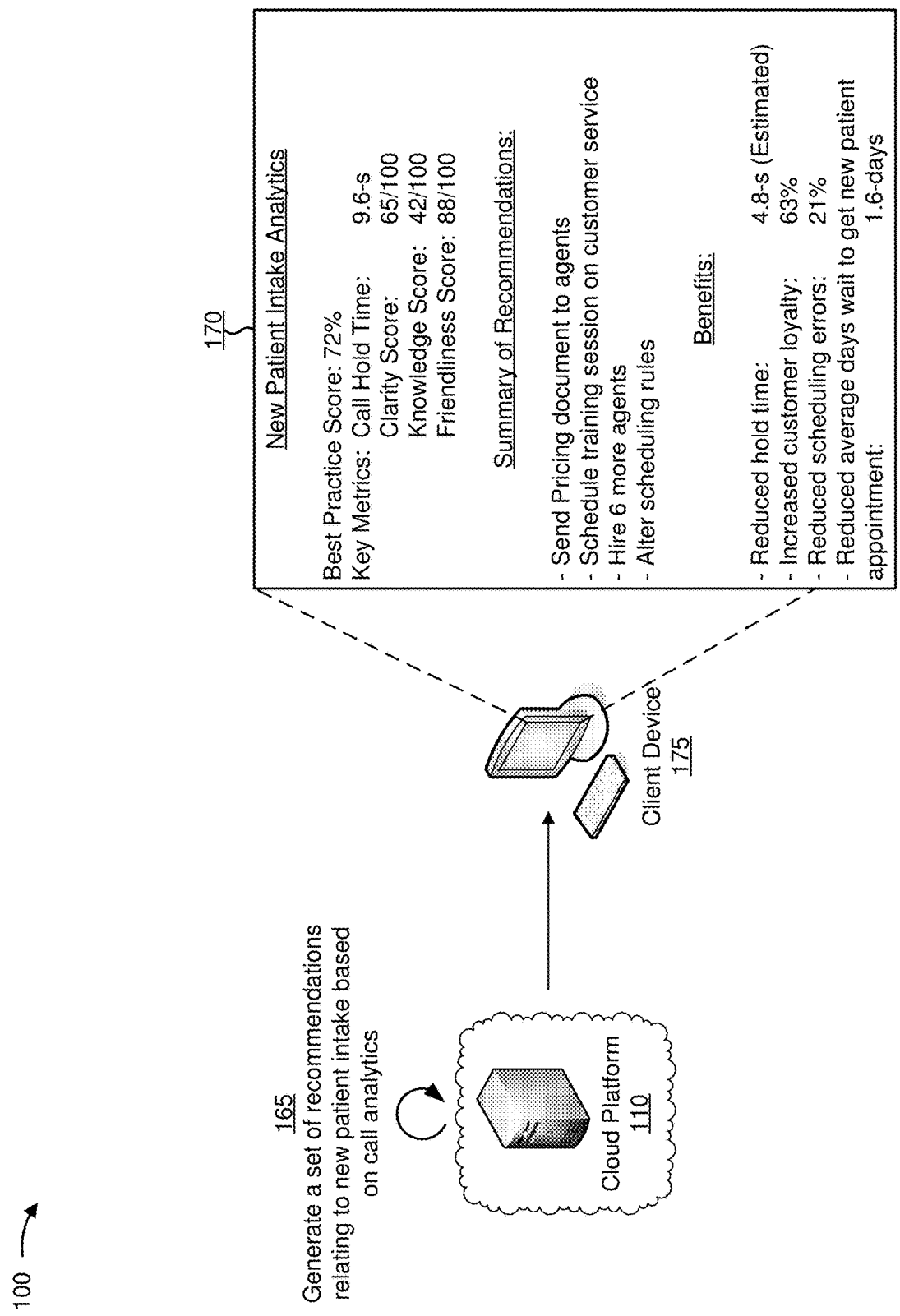

FIGS. 1A-1C are diagrams of an overview of an example implementation 100 described herein. As shown in FIG. 1A, example implementation 100 may include a cloud platform 110 (e.g., operating in a cloud network) that may provide analytics gathering, analysis, and recommendations associated with testing calls to hospitals. Example implementation 100 may further include a communication device 120, such as a phone used by a hospital intake agent, a scheduling server used by a hospital, an instant messaging server, or the like.

As shown by reference number 125, cloud platform 110 may generate a set of user profiles for testing an interaction with a hospital. The user profiles may include information identifying a name, address, set of symptoms, or the like, of a patient (e.g., a fictional patient created for testing purposes). The user profiles may be used to test scheduling by the hospital, a portion of the hospital (e.g., a particular department, doctor, etc.), or a group of hospitals. The user profiles may be stored via a user profile database for utilization during a set of testing calls.

As shown by reference number 130, cloud platform 110 may obtain the generated user profiles from storage. As shown by reference number 135, cloud platform 110 may generate, based on the user profiles, a set of responses for a set of questions that may be asked in a testing call. For example, cloud platform 110 may generate a script for each call, and may populate the script with information specific to each user profile, such as by filling in a set of symptoms from a user profile in a portion of the script where the caller is to identify symptoms (e.g., based on hearing a question such as "what sort of symptoms are you suffering from?" or "what problems are you having?").

As shown by reference number 140, cloud platform 110 may establish a testing call, such as a new patient intake call. For example, cloud platform 110 may initiate a phone call to a hospital to test new patient intake by the hospital. As other examples, cloud platform 110 may establish another type of testing call, such as by accessing a scheduling website to fill out a form of a web portal, initiating a set of email communications, initiating an instant message session, or the like.

As shown in FIG. 1B, and by reference number 145, cloud platform 110 may use an artificial intelligence functionality to communicate with the hospital intake agent via communication device 120. As another example, cloud platform 110 may provide an interactive script to a human caller rather than or in combination with using an AI functionality.

As shown by reference number 150, cloud platform 110 may process audio (speech) received via the patient intake call to generate a response based on the set of responses. As shown by reference number 155, cloud platform 110 may use a computer vocalization functionality to "speak" the response to a question from the hospital intake agent, and may transmit the audio response to communication device 120 of the hospital intake agent. For example, cloud platform 110 may cause a response to a question by the hospital intake agent to be provided for audio playback by communication device 120. As another example, in a case where cloud platform 110 uses a textual method rather than audio to generate the response, cloud platform 110 may generate text and transmit the text for display to the hospital intake agent, may fill in a form, or the like.

As shown by reference number 160, during the call, cloud platform 110 may store call analytics regarding the call, such as a number of rings before pickup, a hold time, a call transcript, an emotion or tone of voice associated with the call (e.g., cloud platform 110 may process call audio to determine whether the hospital intake agent is cheerful, curt, angry, etc.), an availability of appointments (e.g., immediate availability, time to next appointment, flexibility in scheduling, etc.), or the like. In some implementations, cloud platform 110 may filter the data before storing data. For example, when a telephone number is incorrect or disconnected, cloud platform 110 may separately categorize data regarding the call to the telephone number, provide a recommendation to correct the telephone number (e.g., remove the telephone number from a website, correct an error in the telephone number, etc.) and may remove the data from a categorization of data regarding calls that were successfully connected, thereby reducing a quantity of stored data in a data structure storing the data regarding the calls that were successfully connected.

As shown in FIG. 1C, and by reference number 165, cloud platform 110 may generate a set of recommendations relating to new patient intake based on call analytics. As shown by reference number 170, cloud platform 110 may generate a user interface including information relating to the call analytics, such as the set of recommendations, and may provide the user interface for display via a client device 175. For example, cloud platform 110 may generate an objective score relating to use of best practices in patient scheduling, such as a hold time relative to other hospitals that are determined by cloud platform 110 to be similar (e.g., in geography, size, specialty, university affiliation, etc.), an average time that a new patient or existing patient is to wait before receiving an appointment, a quantity of available appointments, a friendliness of the hospital intake agent (e.g., based on an emotion or tone of voice determination), an accuracy of recommendations provided, a quantity of transfers (e.g., to other employees because a first employee lacks knowledge or information to answer a question), or the like. In this way, cloud platform 110 permits objective comparison of hospitals, thereby permitting improved hospital management relative to comparing subject opinions regarding hospital quality and scheduling availability.

In some implementations, cloud platform 110 may provide information identifying metrics determined by cloud platform 110 to correlate strongly to patient ratings. In some implementations, cloud platform 110 may provide recommendations for a person to perform to improve patient scheduling. For example, cloud platform 110 may provide a recommendation relating to providing pricing information associated with procedures at the hospital to hospital intake agents to improve knowledge, to schedule a training session on customer service, to advertise for additional hospital intake agents, to reassign employees to different tasks, or the like. In another example, cloud platform 110 may automatically generate a recommended job listing. In another example, cloud platform 110 may automatically generate a job listing, and post the job listing to a job website, or the like.

In some implementations, cloud platform 110 may communicate with another component to automatically implement one or more of the set of recommendations. For example, cloud platform 110 may communicate with scheduling software to alter scheduling rules relating to when new patients can schedule appointments, thereby reducing an amount of time that a new patient is to wait for an appointment, relative to the scheduling rules remaining static. In some implementations, cloud platform 110 may provide information identifying benefits of the implemented recommendations. For example, cloud platform 110 may provide information indicating that a particular recommendation is associated with an improvement to customer experience, a reduction in scheduling errors, an increase in profitability, or the like. In some implementations, cloud platform 110 may provide information indicating that the one or more recommendations were automatically implemented.

In this way, the cloud platform reduces errors in data collection, which reduces a need to re-collect data (thereby reducing network traffic to communicate with hospital servers, reducing utilization of computing resources for operators to get information from hospital servers, etc.). Furthermore, the cloud platform reduces costs associated with data collection and analytics relative to requiring manual data collection and analytics. In addition, the cloud platform makes it possible to take what was previously subjective data (e.g., a customer's opinion of a hospital), and standardize the data in a format that can be used across one or more institutions, such as hospitals, to allow objective or quantitative scoring regarding performance of the one or more institutions. The cloud platform thus makes it possible to quantitatively compare the performance of one institution against the performance of another. As a result, institutions gain accurate and useful insight into changes that, if made, will improve the performance, customer satisfaction, profitability, etc., of an institution.

As indicated above, FIGS. 1A-1C are provided merely as an example. Other examples are possible and may differ from what was described with regard to FIGS. 1A-1C.

Figure 2:
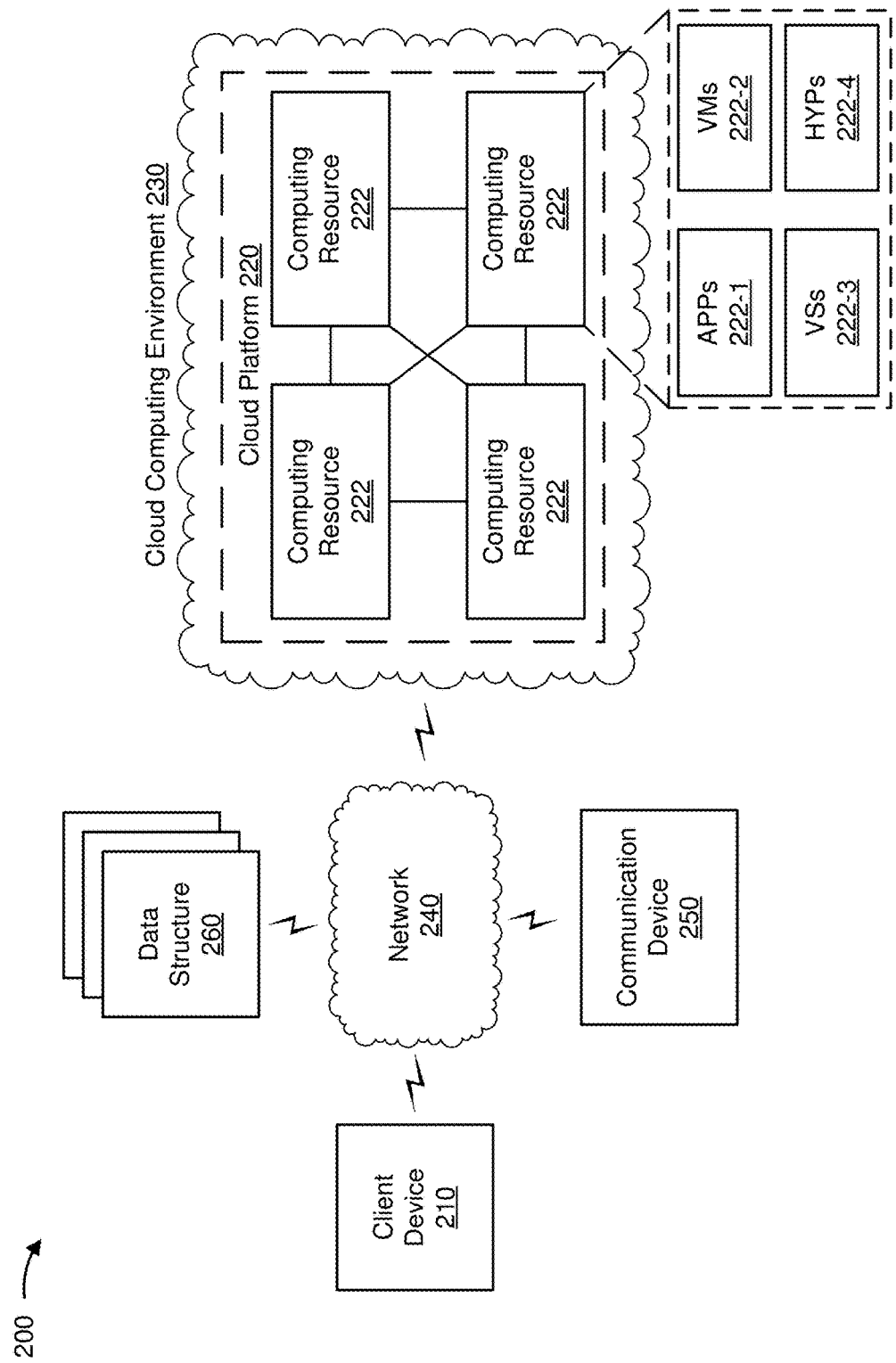
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a cloud platform 220, a cloud computing environment 230, a network 240, a communication device 250, and one or more data structure(s) 260. Devices of environment 200 may interconnect via wired connections, wireless connections, or a combination of wired and wireless connections.

Client device 210 includes one or more devices capable of receiving, generating, storing, processing, and/or providing information associated with providing information associated with healthcare analytics. For example, client device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 210 may provide a user interface including a set of prompts relating to performing a testing call, utilizing an instant messaging application, sending an email communication, using a scheduling application, or the like. In some implementations, client device 210 may provide an analytics platform identifying results of performing analytics on information relating to a set of testing calls. In some implementations, client device 210 corresponds to client device 175, shown in FIG. 1C.

Cloud platform 220 includes one or more devices capable of obtaining analytics information relating to a healthcare environment, as described elsewhere herein. For example, cloud platform 220 may include a cloud server or a group of cloud servers. In some implementations, cloud platform 220 may be designed to be modular such that certain software components can be swapped in or out depending on a particular need. As such, cloud platform 220 may be easily and/or quickly reconfigured for different uses.

In some implementations, as shown, cloud platform 220 may be hosted in cloud computing environment 230. Notably, while implementations described herein describe cloud platform 220 as being hosted in cloud computing environment 230, in some implementations, cloud platform 220 may not be cloud-based (i.e., may be implemented outside of a cloud computing environment) or may be partially cloud-based. Although implementations are described herein as obtaining and analyzing data relating to a healthcare environment, cloud platform 220 may be utilized to obtain and analyze data relating to another environment, such as a governmental environment, a corporate environment, an educational environment, or the like.

Cloud computing environment 230 includes an environment that hosts cloud platform 220. Cloud computing environment 230 may provide computation, software, data access, storage, etc. services that do not require end-user (e.g., client device 210) knowledge of a physical location and configuration of system(s) and/or device(s) that hosts cloud platform 220. As shown, cloud computing environment 230 may include a group of computing resources 222 (referred to collectively as "computing resources 222" and individually as "computing resource 222").

Computing resource 222 includes one or more personal computers, workstation computers, server devices, or another type of computation and/or communication device. In some implementations, computing resource 222 may host cloud platform 220. The cloud resources may include compute instances executing in computing resource 222, storage devices provided in computing resource 222, data transfer devices provided by computing resource 222, etc. In some implementations, computing resource 222 may communicate with other computing resources 222 via wired connections, wireless connections, or a combination of wired and wireless connections.

As further shown in FIG. 2, computing resource 222 includes a group of cloud resources, such as one or more applications ("APPs") 222-1, one or more virtual machines ("VMs") 222-2, one or more virtualized storages ("VSs") 222-3, and/or one or more hypervisors ("HYPs") 222-4.

Application 222-1 includes one or more software applications that may be provided to or accessed by client device 210. Application 222-1 may eliminate a need to install and execute the software applications on client device 210. For example, application 222-1 may include software associated with cloud platform 220 and/or any other software capable of being provided via cloud computing environment 230. In some implementations, one application 222-1 may send/receive information to/from one or more other applications 222-1, via virtual machine 222-2.

Virtual machine 222-2 includes a software implementation of a machine (e.g., a computer) that executes programs like a physical machine. Virtual machine 222-2 may be either a system virtual machine or a process virtual machine, depending upon use and degree of correspondence to any real machine by virtual machine 222-2. A system virtual machine may provide a complete system platform that supports execution of a complete operating system ("OS"). A process virtual machine may execute a single program, and may support a single process. In some implementations, virtual machine 222-2 may execute on behalf of a user (e.g., client device 210), and may manage infrastructure of cloud computing environment 230, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 222-4 may provide hardware virtualization techniques that allow multiple operating systems (e.g., "guest operating systems") to execute concurrently on a host computer, such as computing resource 222. Hypervisor 222-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Communication device 250 includes one or more devices capable of receiving, generating, storing, processing, and/or providing information associated with a healthcare environment. For example, communication device 250 may include a communication device, such as a telephone, a mobile phone (e.g., a smart phone, a radiotelephone, etc.), a laptop computer, a desktop computer, a tablet computer, a handheld computer, a wearable communication device (e.g., a communication functionality of a smart wristwatch, a pair of smart eyeglasses, etc.), a server, or a similar type of device.

In some implementations, communication device 250 may include a telephone used by a hospital intake agent, a scheduling server that provides scheduling information and stores appointments, a computer that operates an instant messaging application for a hospital intake agent, or the like. In some implementations, communication device 250 may be utilized by a user who is communicating with a hospital intake operator to schedule an appointment based on a testing call script provided by cloud platform 220, and may communicate with cloud platform 220 to provide information for which cloud platform 220 stores analytics. In some implementations, communication device 250 corresponds to communication device 120 shown in FIGS. 1A and 1B.

Data structure 260 includes one or more devices capable of storing and/or providing information associated with a healthcare environment. For example, data structure 260 may include a data structure storing a set of phone numbers utilized by a hospital to receive scheduling phone calls. Additionally, or alternatively, data structure 260 may include a data structure storing biography information regarding a group of doctors at a hospital.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
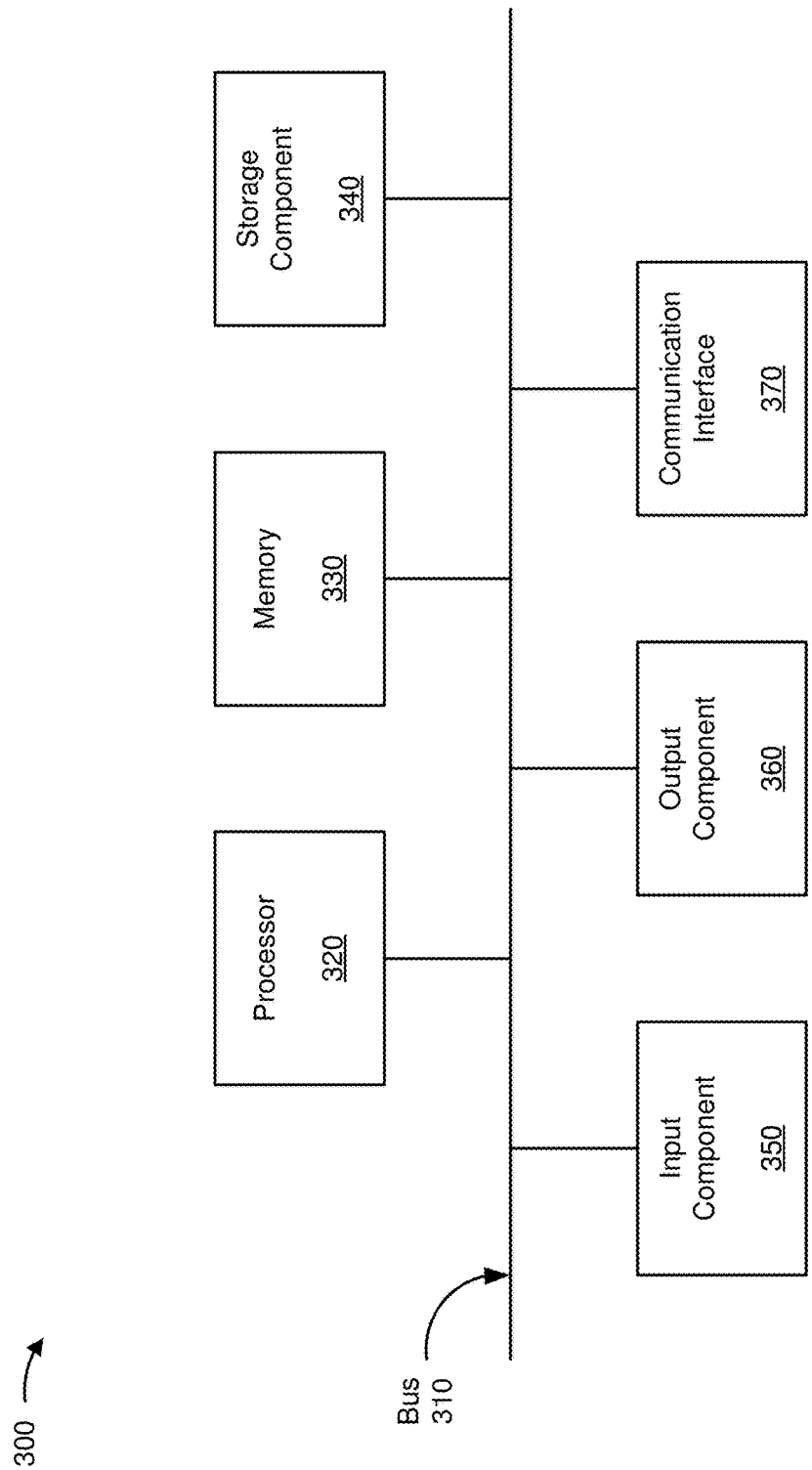
FIG. 3 is a diagram of example components of one or more devices of FIG. 2.

FIG. 3 is a diagram of example components of a device 300. Device 300 may correspond to client device 210, cloud platform 220, and/or communication device 250. In some implementations, client device 210, cloud platform 220, and/or communication device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
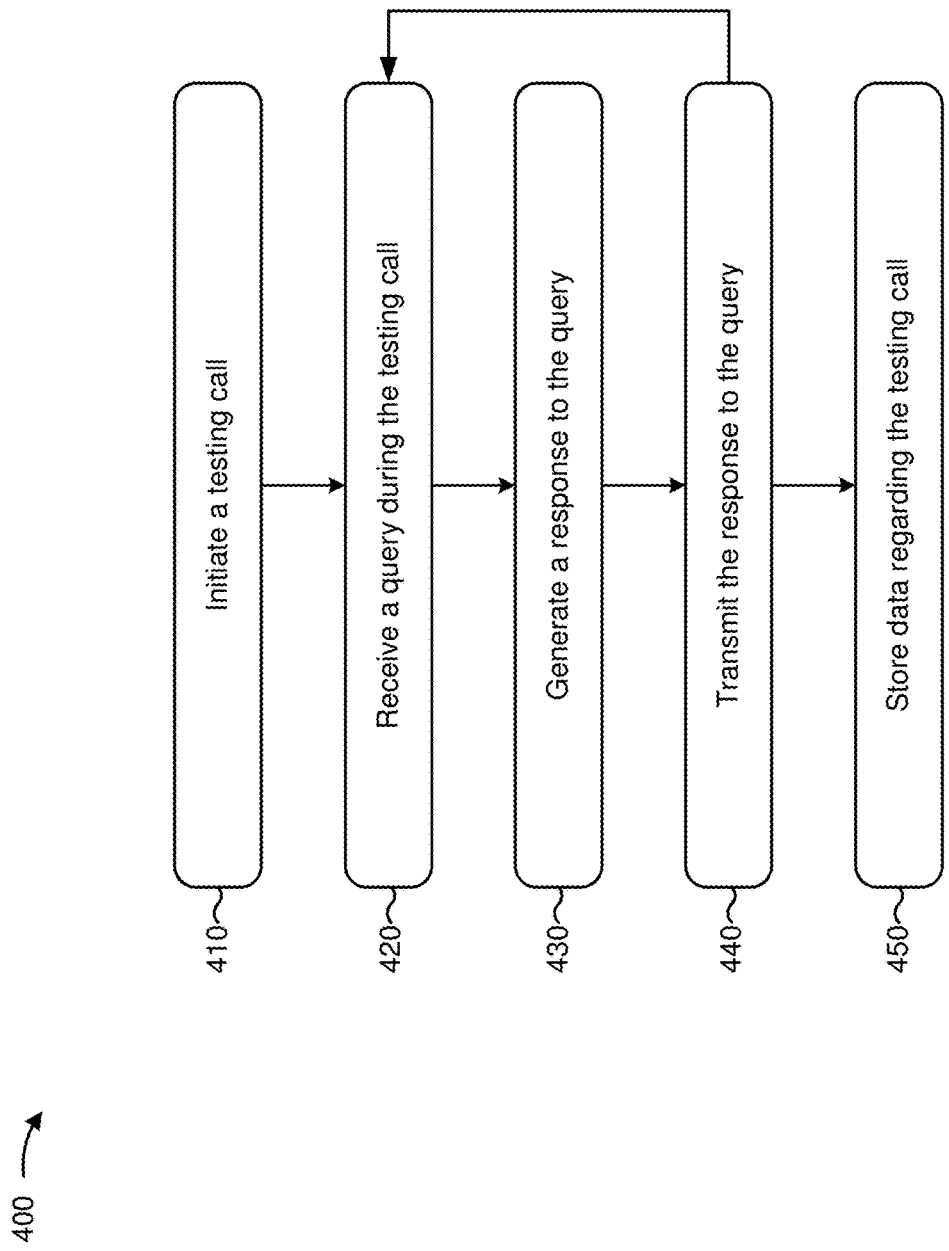
FIG. 4 is a flow chart of an example process for obtaining data relating to a testing call.

FIG. 4 is a flow chart of an example process 400 for obtaining data relating to a testing call. In some implementations, one or more process blocks of FIG. 4 may be performed by cloud platform 220. In some implementations, one or more process blocks of FIG. 4 may be performed by another device or a group of devices separate from or including cloud platform 220, such as client device 210 and/or communication device 250.

As shown in FIG. 4, process 400 may include initiating a testing call (block 410). For example, cloud platform 220 may initiate a testing call. In some implementations, the testing call may include a phone communication with a hospital intake agent. In some implementations, the testing call may relate to another context, such as another type of call center used by a university, a store, a government agency, or the like. Additionally, or alternatively, the testing call may include an email, an instant message, utilization of an online scheduling platform, or the like.

In some implementations, cloud platform 220 may initiate the testing call by selecting a phone number, an email address, or the like. For example, cloud platform 220 may select a phone number, such as from data structure 260, based on a list of phone numbers, an employee roster (e.g., identifying hospital intake agents, etc.), or the like. As a particular example, cloud platform 220 may crawl a website of a hospital to obtain the list of phone numbers. In this case, cloud platform 220 may store information regarding an ease of use in obtaining the list of phone numbers, such as an amount of time required to locate the list of phone numbers, a quantity of pages visited to locate the list of phone numbers, or the like.

In some implementations, cloud platform 220 may initiate the testing call based on a call plan. For example, the call plan may include information identifying a target of testing (e.g., a hospital, a group of hospitals, a department of a hospital, or the like) that is to be evaluated, a set of metrics that is to be obtained, or the like. As another example, the call plan may include information regarding a user profile for a caller, such as a name, an address, a condition, a symptom, a schedule availability, or the like, to be used to test scheduling by the hospital.

In some implementations, cloud platform 220 may generate the call plan. For example, cloud platform 220 may select a group of hospitals based on a common characteristic (e.g., size, specialty, university affiliation, position in a ranking of hospitals, etc.). As another example, cloud platform 220 may generate a set of user profiles for the call plan using publically available information, such as lists of names, conditions, symptoms, or the like.

In some implementations, cloud platform 220 may generate a script for the testing call based on the call plan. For example, the script may include a set of responses (e.g., answers, questions, etc., to the hospital intake agent) to a set of prompts (e.g., answers, questions, etc., from the hospital intake agent). In this case, cloud platform 220 may generate a set of dependencies to link the set of responses to the set of prompts (e.g., a particular prompt may trigger a particular response).

In some implementations, cloud platform 220 may generate a user interface for the script (e.g., a user interface to receive a user interaction associated with identifying a prompt and to provide a response for display). Additionally, or alternatively, cloud platform 220 may apply a vocalization technique to generate audio of each response that is to be provided for automated testing calls (e.g., rather than the user speaking the response).

By generating a script in advance and storing the script for repeated use, cloud platform 220 reduces use of processing resources relative to generating the script each time a call is made. In this way, cloud platform 220 may reduce time for each call by permitting responses to be provided quicker. Furthermore, cloud platform 220 may ensure consistency in a method of gathering information from the testing calls.

As further shown in FIG. 4, process 400 may include receiving a query during the testing call (block 420). For example, cloud platform 220 may receive a query during the testing call. In some implementations, the query may include a question to be answered, an answer to a question asked, or the like, from a hospital intake agent. In some implementations, cloud platform 220 may receive the query based on monitoring the testing call.

In some implementations, cloud platform 220 may receive the query based on a user interaction with a user interface. For example, cloud platform 220 may detect a user interaction with the user interface to identify the query, such as by detecting a button press of a "yes" button to indicate a yes response to a yes or no question (e.g., "do you have any availability?") that the user asked. In some implementations, cloud platform 220 may receive the query by processing text (e.g., for a textual testing call, such as an email or an instant message exchange). Additionally, or alternatively, cloud platform 220 may receive the query based on processing audio (e.g., by performing a natural language recognition technique on call audio).

As further shown in FIG. 4, process 400 may include generating a response to the query (block 430). For example, cloud platform 220 may generate a response to the query. In some implementations, cloud platform 220 may generate the response based on the script. For example, cloud platform 220 may identify a response in a pre-generated script corresponding to the query, and may select the response. In this case, cloud platform 220 may evaluate a set of potential queries with a set of linkages to a set of responses, may select a query that matches the received query (e.g., based on generating a similarity score), and may select a response that is linked to the selected query as the response to the query. In some implementations, cloud platform 220 may generate the response using an artificial intelligence (AI) technique, a natural language processing technique, or the like. In some implementations, cloud platform 220 may generate scores for a set of potential responses, and may select the response based on the scores. For example, cloud platform 220 may determine a score that reflects a likelihood that a particular potential response is relevant to the query, and may select the particular potential response as the response based on the score satisfying a threshold or based on the score being greater than a score of another response.

In some implementations, cloud platform 220 may generate text for the response. For example, cloud platform 220 may generate text for display via a user interface to a user, to be provided as a text-based response to an instant message communication, to be provided as an email, or the like. Additionally, or alternatively, cloud platform 220 may generate audio for the response. For example, using a vocalization technique, cloud platform 220 may generate computer-generated audio for the response (e.g., from the text of the response). Additionally, or alternatively, cloud platform 220 may select stored audio for the response. For example, cloud platform 220 may search an audio data structure to identify a stored audio response to the query (e.g., a stored audio answer, "Yes," a stored audio question, "Do you have availability on Tuesday," or the like, that is pre-recorded or pre-generated).

As further shown in FIG. 4, process 400 may include transmitting the response to the query (block 440). For example, cloud platform 220 may transmit the response to the query. In some implementations, cloud platform 220 may transmit the response by transmitting audio over the phone (e.g., audio received via a microphone from a user reading the response provided via a user interface, audio generated using the vocalization technique, etc.). Additionally, or alternatively, cloud platform 220 may transmit the response by transmitting a textual message (e.g., email, instant message, etc.). Additionally, or alternatively, cloud platform 220 may transmit the response by interacting with a user interface. For example, cloud platform 220 may cause a mouse click to be performed to select a calendar date via an online scheduling platform of a hospital.

In some implementations, cloud platform 220 may continue the testing call until a purpose of the call is completed (e.g., when an appointment is scheduled, when a chain of multiple linked responses indicate that the call is completed, etc.). For example, cloud platform 220 may receive one or more subsequent queries, generate one or more subsequent responses, and/or transmit the one or more subsequent responses.

As further shown in FIG. 4, process 400 may include storing data regarding the testing call (block 450). For example, cloud platform 220 may store data regarding the testing call. The data may include a set of metrics regarding the testing call. For example, the set of metrics may relate to speed associated with the testing call. In this case, a metric may be associated with a queue time, hold time, transfer time, effective time, total call time, or the like.

As another example, the set of metrics may relate to complexity associated with the testing call. In this case, a metric may be associated with a percentage of first call resolutions, transfers, phone tree complexity, voice mails required, or the like.

As yet another example, the set of metrics may relate to reliability associated with the testing call. In this case, a metric may be associated with an eventual call resolution percentage, a returned voice mail percentage, calls dropped, or the like.

As still another example, the set of metrics may relate to availability associated with the testing call. In this case, a metric may be associated with a number of days until a first available appointment, a patient preference, or the like.

As another example, the set of metrics may relate to financial information associated with the testing call. In this case, a metric may be associated with insurance requested, cost of the appointment, cost of facility fees relating to the appointment, or the like.

As still another example, the set of metrics may relate to caller experience associated with the testing call. In this case, a metric may be associated with a caller experience score, agent friendliness, agent knowledge, mobile, web, and off hours scheduling options, or the like.

In some implementations, cloud platform 220 may utilize a processing technique to determine the set of metrics. For example, cloud platform 220 may analyze a tone of voice of call audio to determine friendliness, may use natural language processing to process a call transcript to determine positivity/friendliness vs negativity/unfriendliness, or the like. As another example, cloud platform 220 may analyze volume of audio of calls to determine inactivity or hold time during calls. As yet another example, cloud platform 220 may detect a hold during a call based on text recognition of a call transcript to determine a hold period and a hold time.

In some implementations, cloud platform 220 may filter the data, such as by removing data regarding call time when the call is not completed (e.g., to avoid a broken telephone number being misinterpreted as a quickly completed call). In this way, by not storing data regarding invalid calls, cloud platform 220 may reduce data storage requirements.

In some implementations, cloud platform 220 may evaluate answers based on information obtained from a hospital data structure to determine knowledge level. For example, cloud platform 220 may determine an accuracy of knowledge of a hospital intake agent knowledge (e.g., a hospital intake agent may indicate that appointments are available on Monday, and cloud platform 220 may determine that a hospital database of appointments indicates that appointments are available on Monday and also available on Tuesday). As another example, cloud platform 220 may determine cost estimation accuracy based on crawling a hospital website to locate a document identifying cost estimates for procedures, based on identifying costs for procedures at similar hospitals, or the like.

In some implementations, cloud platform 220 may determine a set of statistical metrics relating to performing testing calls. For example, cloud platform 220 may determine whether a quantity of data regarding a particular metric is associated with a statistically significant sample size. In this case, if the quantity of data is not associated with a statistically significant sample size, then cloud platform 220 may cause another call to be performed, and if the quantity of data is associated with a statistically significant sample size, then cloud platform 220 may end testing calls. In this way, cloud platform 220 may reduce a total number of calls relative to utilizing a fixed quantity of calls, which may result in excessive calls being performed.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
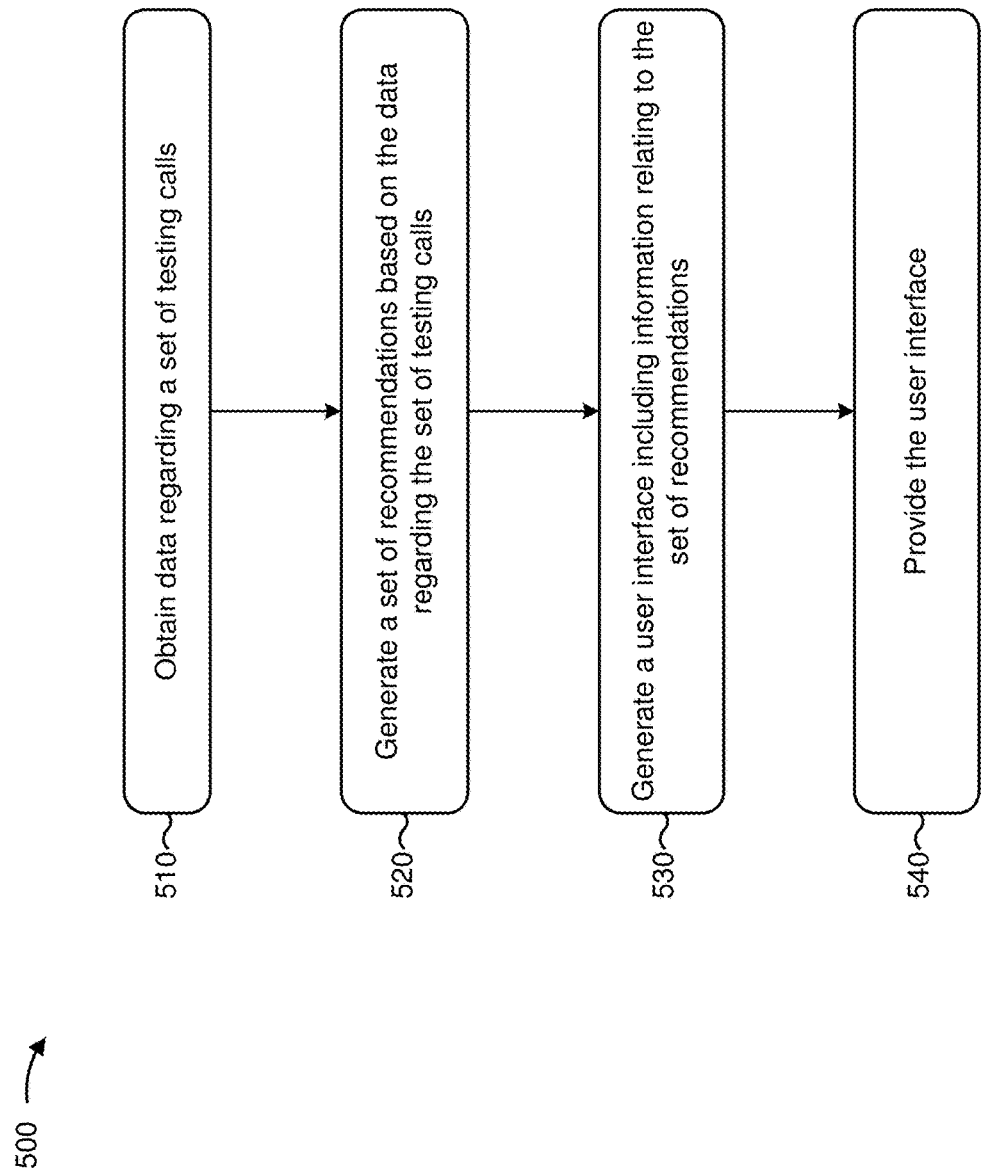
FIG. 5 is a flow chart of an example process for providing an analytics platform relating to data obtained from a set of testing calls.

FIG. 5 is a flow chart of an example process 500 for providing an analytics platform relating to data obtained from a set of testing calls. In some implementations, one or more process blocks of FIG. 5 may be performed by cloud platform 220. In some implementations, one or more process blocks of FIG. 5 may be performed by another device or a group of devices separate from or including cloud platform 220, such as client device 210, cloud platform 220, and/or communication device 250.

As shown in FIG. 5, process 500 may include obtaining data regarding a set of testing calls (block 510). For example, cloud platform 220 may obtain data regarding a set of testing calls. In some implementations, cloud platform 220 may initiate a set of testing calls to obtain the data. For example, cloud platform 220 may initiate the set of testing calls, as described herein, to obtain data relating to scheduling of appointments at hospitals. In some implementations, cloud platform 220 may obtain stored data regarding a set of previously performed testing calls, such as a set of metrics regarding a hospital, a group of hospitals, a set of entities similar to a particular hospital (e.g., a set of similar hospitals, departments, health networks, etc.), a set of departments of a set of hospitals, or the like.

As further shown in FIG. 5, process 500 may include generating a set of recommendations based on the data regarding the set of testing calls (block 520). For example, cloud platform 220 may generate a set of recommendations based on the data regarding the set of testing calls.

In some implementations, cloud platform 220 may determine a set of scores based on the data. For example, cloud platform 220 may process the data to determine a score relating to a market position of the hospital relative to other similar hospitals based on the data. In this case, cloud platform 220 may determine the set of scores based on a first available appointment, based on a first call resolution, based on an eventual call resolution, based on an average speed to answer, based on an average total inactive time, or the like.

As another example, cloud platform 220 may determine the set of scores based on appointment availability. In this case, cloud platform 220 may determine the set of scores based on a longest wait time by specialty, based on a quantity of holds initiated during identification of an available appointment, based on a variation in scheduling by channel (e.g., central scheduling or physician office), based on variations in facility scheduling, or the like.

As yet another example, cloud platform 220 may determine the set of scores based on customer experience or user satisfaction. In this case, cloud platform 220 may determine the set of scores based on schedulers' knowledge and/or friendliness, based on an ability to schedule for multiple appointments, based on a consistent experience across scheduling channels, based on an ability to answer user financial questions, or the like.

As still another example, cloud platform 220 may determine the set of scores based on digital channel access scores relative to other similar hospitals, departments, or the like. In this case, cloud platform 220 may determine digital channel access scores based on first available appointment, based on information provided to the consumer (e.g., provider ratings, insurance, etc.), based on digital access capability maturity (e.g., online scheduling), or the like.

In some implementations, cloud platform 220 may combine multiple metrics to determine a score. Additionally, or alternatively, cloud platform 220 may generate a ranking based on the set of scores. In some implementations, cloud platform 220 may identify a set of best practices associated with other hospitals, departments, or the like, with higher scores. In some implementations, cloud platform 220 may apply a set of weights to the multiple metrics to determine the score. For example, cloud platform 220 may determine that a correlation between a set of metrics and a customer experience rating, and may apply a set of weights associated with the correlation to each score of the set of scores to generate the ranking.

In some implementations, cloud platform 220 may generate a recommendation relating to the set of best practices or the set of scores. For example, if a score for a particular metric or set of metrics fails to satisfy a threshold, cloud platform 220 may generate a recommendation based on stored information identifying potential recommendations (e.g., recommendations provided to other hospitals, at other times, etc.), to cause the particular metric or set of metrics to satisfy the threshold. In some implementations, cloud platform 220 may utilize a computer learning technique, such as an artificial intelligence technique or the like to generate recommendation and/or select the recommendation for implementation.

In some implementations, cloud platform 220 may generate a training recommendation, an information distribution recommendation, a hiring recommendation, an advertising recommendation (e.g., "#1 Hospital for Getting An Appointment On The Same Day!"), or the like.

In some implementations, cloud platform 220 may generate a scheduling recommendation. For example, cloud platform 220 may generate a recommendation to change a set of rules regarding scheduling. As a particular example, cloud platform 220 may change from a first scheduling rule (e.g., orthopedics scheduling for Monday only, surgery scheduling for Tuesday only) to a second scheduling rule (e.g., orthopedics scheduling for any day, surgery for any afternoon) to increase schedule availability for doctors.

In some implementations, cloud platform 220 may generate a new portal recommendation. For example, cloud platform 220 may generate a recommendation to allow online scheduling instead of allowing scheduling only by phone. In this case, cloud platform 220 may automatically generate an online scheduling platform by adapting another existing online scheduling platform, a template, or the like and may publish the online scheduling platform to the hospital's website automatically.

In some implementations, cloud platform 220 may generate scores for the set of recommendations. For example, cloud platform 220 may generate scores based on estimated cost, feasibility, likelihood of implementation, benefit, or the like. In some implementations, cloud platform 220 may select a subset of the set of recommendations based on the set of scores.

In some implementations, cloud platform 220 may generate a pricing recommendation based on pricing information. For example, cloud platform 220 may obtain prices during calls for different procedures/appointments, and may provide a recommendation relating to modifying the pricing based on other hospitals that are determined by cloud platform 220 to be similar (e.g., that are associated with a similarity score relating to geography, size, specialty, university affiliation, determined metrics, etc. that satisfies a threshold).

As further shown in FIG. 5, process 500 may include generating a user interface including information relating to the set of recommendations (block 530). For example, cloud platform 220 may generate a user interface including information relating to the set of recommendations.

In some implementations, cloud platform 220 may generate a set of user interface elements to provide information identifying the set of recommendations. For example, cloud platform 220 may generate a ranking of recommendations, information identifying benefits of recommendations, or the like.

Additionally, or alternatively, cloud platform 220 may generate a set of user interface elements to provide information from which the recommendations are generated (e.g., the data). In this case, cloud platform 220 may identify scores/rankings of metrics described herein. For example, cloud platform 220 may automatically identify significant metrics (e.g., objective metrics with a threshold correlation to a particular subjective metric, such as hold time corresponding to customer experience ratings).

As further shown in FIG. 5, process 500 may include providing the user interface (block 540). For example, cloud platform 220 may provide the user interface.

In some implementations, cloud platform 220 may provide the user interface for display via a client device 210. In some implementations, cloud platform 220 may provide a set of alerts regarding the metrics. For example, cloud platform 220 may provide an alert if a metric drops below a threshold value during periodic automated testing calls.

In some implementations, cloud platform 220 may provide information identifying the recommendations. In some implementations, cloud platform 220 may implement the recommendations automatically. For example, cloud platform 220 may implement a recommendation automatically based on a score for the recommendation satisfying a threshold. In this way, cloud platform 220 may reduce network traffic associated with transmitting a request for authorization to implement the recommendation to for display to a user. As a particular example, cloud platform 220 may automatically generate a job posting using a text generation technique and post the job posting to a server. In this way, cloud platform 220 may reduce a utilization of computing resources relative to a user being required to navigate a data structure to locate a job posting template, generate the job posting, navigate a job posting website to identify a location to which to post the job, and post the job. In some implementations, cloud platform 220 may transmit a request to a user for approval to automatically post a job posting and may, upon receiving a confirmation, automatically post the job posting. As yet another example, cloud platform 220 may search the internet (e.g., crawl the web) to automatically identify a training program (e.g., relating to customer service, politeness, etc.), and provide a link to the training program to a set of employees. As still another example, cloud platform 220 may change a budget allocation or a work schedule (e.g., a set of task assignments of a set of employees of a hospital) to increase a quantity of employees performing intake scheduling, or the like. In some implementations, cloud platform 220 may provide information indicating that the recommendations are implemented.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein provide an analytics gathering, analysis, and recommendation platform (e.g., a cloud platform) for hospitals. The cloud platform may provide artificial intelligence based automations, such as voice recognition and speech synthesis (e.g., to conduct calls with operators to obtain data), automated data gathering from calls, automated data analysis, automated recommendation generation, or the like. The cloud platform may further provide recommendations to improve hospital operations related to user interaction, such as scheduling, patient information, or the like.

In this way, the cloud platform reduces errors in data collection, which reduces a need to re-collect data (thereby reducing network traffic to communicate with hospital servers, reducing utilization of computing resources for operators to get information from hospital servers, etc.). Furthermore, the cloud platform reduces costs associated with data collection and analytics relative to requiring manual data collection and analytics. Moreover, the cloud platform objectively characterizes (e.g., using a set of metrics obtained from testing calls) performance of a hospital with regard to the set of metrics, thereby permitting comparison of the hospital to other hospitals and improved management of the hospital relative to utilizing subjective opinion-based assessment of hospital performance.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      generate a call plan for a set of testing calls,
         the call plan including information identifying a set of targets for the set of testing calls and a set of user profiles for the set of testing calls;
      initiate a testing call, of the set of testing calls, to a communication device associated with a target, of the set of targets, using a user profile of the set of user profiles;
      initiate monitoring for the testing call to identify information exchanged between the device and the communication device associated with the target during the testing call;
      receive audio during the testing call from the communication device based on the monitoring of the testing call,
         the audio including one or more queries;
      process the audio using a natural language processing technique to generate a transcript of the testing call;
      generate, based on the user profile and the transcript of the testing call, one or more responses to the one or more queries;
      transmit, to the communication device, the one or more responses to the one or more queries based on generating the one or more responses to the one or more queries; and
      store data regarding the testing call,
         the data relating to one or more metrics associated with the testing call or information received during the testing call;
      process the stored data regarding the testing call and other data regarding one or more other testing calls to generate a recommendation relating to the set of targets for the set of testing calls; and
      communicate with one or more other devices to implement the recommendation.

2. The device of claim 1, where the one or more processors are further to:
   generate the recommendation based on data regarding the set of testing calls,
      the data regarding the set of testing calls including the data regarding the testing call;
   generate a user interface including information relating to the recommendation; and
   provide the user interface for display.

3. The device of claim 1, where the one or more processors, when generating the one or more responses, are to:
   generate a transcript of a particular response of the one or more responses;
   generate audio of the particular response using a vocalization technique and based on the transcript of the particular response; and
   where the one or more processors, when transmitting the one or more responses, are to:
      transmit the audio of the particular response for playback via the communication device.

4. The device of claim 1, where the one or more processors, when generating the one or more responses are to:
   match a first query, of the one or more queries, to a second query of a set of potential queries stored by the device,
      the set of potential queries being associated with a set of linkages to a set of responses;
   determine, based on the set of linkages to the set of responses, a particular response, of the set of responses, corresponding to the second query; and
   select the particular response for the first query based on determining the particular response.

5. The device of claim 1, where the one or more processors, when generating the one or more responses, are to:
   generate the one or more responses using an artificial intelligence technique.

6. The device of claim 1, where the one or more processors are further to:
   identify, based on the audio, a hold time of the testing call; and
   where the one or more processors, when storing the data regarding the testing call, are to:
      store information identifying the hold time of the testing call.

7. A method, comprising:
   obtaining, by a device, data regarding a set of testing calls of a target of testing,
      the data relating to scheduling of appointments with the target of testing;

generating, by the device, a set of recommendations for
the target of testing based on the data regarding the set
of testing calls,
the set of recommendations relating to improving
scheduling of appointments with the target of testing;
generating, by the device, a user interface including
information relating to the set of recommendations,
the information relating to the set of recommendations
including the set of recommendations and a ranking
of the target of testing within a group of entities;
providing, by the device, the user interface for display;
detecting, by the device, a user interaction with the user
interface,
the user interaction being associated with selecting a
particular recommendation of the set of recommendations; and
transmitting, by the device, information to cause the
particular recommendation to be implemented and the
user interface to be updated.

8. The method of claim 7, further comprising:
generating a call plan for the set of testing calls;
performing the set of testing calls using the call plan; and
storing the data regarding the set of testing calls during
performance of the set of testing calls.

9. The method of claim 7, where generating the set of recommendations comprises:
generating a set of scores for the set of recommendations
based on costs of the set of recommendations and
benefits of the set of recommendations; and
determining that a subset of the set of recommendations
are associated with scores satisfying a threshold; and
where generating the user interface comprises:
including, in the user interface, information identifying
the subset of the set of recommendations based on
determining that the subset of the set of recommendations are associated with scores satisfying the
threshold.

10. The method of claim 7, where generating the set of recommendations comprises:
generating one or more recommendations relating to at
least one of:
a scheduling rule,
a task assignment, or
a budget.

11. The method of claim 7, further comprising:
determining one or more metrics relating to the target of
testing based on the data regarding the set of testing
calls; and
generating the ranking of the target of testing relative to
the group of entities based on one or more metrics
associated with the target of testing.

12. The method of claim 7, further comprising:
obtaining information regarding a plurality of potential
similar entities;
generating similarity scores for the plurality of potential
similar entities based on the information regarding the
plurality of potential similar entities and information
relating to the target of testing; and
selecting the group of entities from the plurality of
potential similar entities based on the similarity scores,
the group of entities being associated with a group of
similarity scores that satisfy a threshold.

13. The method of claim 7, further comprising:
processing the data regarding the set of testing calls to
identify a set of metrics associated with the scheduling
of appointments,
the set of metrics determined to correspond to user
satisfaction with scheduling of appointments with
the target of testing; and
where generating the set of recommendations comprises:
generating the set of recommendations to improve the
set of metrics for the target of testing.

14. A non-transitory computer-readable medium storing
instructions, the instructions comprising:
one or more instructions that, when executed by one or
more processors, cause the one or more processors to:
initiate a plurality of testing calls for an entity,
the plurality of testing calls being associated with
testing scheduling of appointments at the entity;
receive audio during the plurality of testing calls,
the audio including one or more queries;
process the audio using a natural language processing
technique to generate a transcript of the plurality of
testing calls;
obtain data regarding the plurality of testing calls,
the data including the transcript of the plurality of
testing calls, and
the data being associated with customer experience
for scheduling of appointments at the entity;
process the data to generate a set of metrics regarding
the entity;
generate a recommendation for the entity based on the
set of metrics,
the recommendation being associated with improving one or more metrics of the set of metrics;
generate a user interface to provide results of the
plurality of testing calls,
the user interface including information identifying
the set of metrics and information identifying the
recommendation; and
provide the user interface for display.

15. The non-transitory computer-readable medium of
claim 14, where the one or more instructions, that cause the
one or more processors to initiate the plurality of testing
calls, cause the one or more processors to:
obtain a call script relating to the plurality of testing calls;
automatically communicate with one or more communication devices using the call script to perform the
plurality of testing calls; and
where the one or more instructions, that cause the one or
more processors to obtain the data regarding the plurality of testing calls, cause the one or more processors
to:
store data based on automatically communicating with
the one or more communication devices.

16. The method of claim 7, further comprising:
obtaining stored information identifying a set of metrics
relating to the group of entities; and
generating the ranking of the target of testing based on the
set of metrics relating to the group of entities.

17. The non-transitory computer-readable medium of
claim 14, where the one or more instructions, when executed
by the one or more processors, further cause the one or more
processors to:
obtain stored information identifying another set of metrics relating to a group of other entities;
generate a ranking of the entity relative to the group of
other entities based on the set of metrics regarding the
entity and the other set of metrics relating to the group
of other entities; and
where the one or more instructions, that cause the one or
more processors to generate the user interface, cause
the one or more processors to:

include information identifying the ranking of the entity relative to the group of other entities in the user interface.

18. The non-transitory computer-readable medium of claim 14, where the plurality of testing calls include at least one of:
a phone call,
an instant message communication,
an email communication, or
a utilization of a web portal.

19. The non-transitory computer-readable medium of claim 14, where the one or more instructions, that cause the one or more processors to generate the recommendation, further cause the one or more processors to:
generate the recommendation based on data relating to pricing of one or more services provided by the entity.

20. The non-transitory computer-readable medium of claim 14, where the one or more instructions, when executed by the one or more processors, further cause the one or more processors to:
provide another user interface for display during the plurality of testing calls to identify, to a user, a set of responses to a set of potential queries received during the plurality of testing calls.

* * * * *